United States Patent [19]

Chalmers

[11] 4,230,144
[45] Oct. 28, 1980

[54] SEISMIC SUPPORT FOR PENDANTLY SUSPENDED BODY

[75] Inventor: Dennis W. Chalmers, Charlotte, Vt.

[73] Assignee: Hayward Tyler Pump Company, Chittenden, Vt.

[21] Appl. No.: 45,858

[22] Filed: Jun. 6, 1979

[51] Int. Cl.³ .............................................. F16L 3/00
[52] U.S. Cl. ..................................... 137/343; 248/49; 417/360
[58] Field of Search ...................... 137/343, 356, 363; 417/360; 248/49

[56] References Cited

U.S. PATENT DOCUMENTS 3,938,545   2/1976   Nagy et al. ...................... 417/360 X

*Primary Examiner*—Gerald A. Michalsky
*Attorney, Agent, or Firm*—Cooper, Dunham, Clark, Griffin & Moran

[57] ABSTRACT

A support system for preventing the displacement of a pendantly suspended body, such as a submersible, turbine or sump pumping apparatus, and comprising one or more fixed frame structures which surround the body below its point of suspending and each of which has a plurality of abutment members disposed thereon about the periphery of the body, that cooperatingly engage a similar number of abutment plates on the body to hold it against lateral or pendulous displacement. When the body is inserted through the frame structures, it is oriented such that the abutment plates on its periphery pass into the interstices between the abutment members on the frame structures. Before the upper end of the body is fastened to its suspension mounting the body is rotated so that the outer edges of the abutment plates engage the outer edges of respective abutment members with a small clearance fit securing the body against movement. The ends of the outer edges of the abutment plates are rounded to facilitate smooth sliding engagement of the abutting surfaces.

11 Claims, 5 Drawing Figures

SEISMIC SUPPORT FOR PENDANTLY SUSPENDED BODY

BACKGROUND OF THE INVENTION

The present invention relates to seismic supports for vertically mounted elongated bodies and more particularly to a support structure for securing a pendantly suspended body, such as a sump pumping apparatus, against movement.

It is particularly important in comparatively large installations where operating machinery is pendantly suspended with an elongated portion extending down into an area of difficult accessibility, such as an intake sump, a well, a reactor pool, or like excavation, that the elongated portion be secured against any lateral or pendulous movement due to seismic or other disturbances. Such movement, continuously or in the extreme, may damage the machinery by causing misalignment or bending of the shafts or rupturing of conduts. For example, it is imperative that sump pumping apparatus used in circulating the cooling water in nuclear reactor emergency cooling systems be securely mounted to protect against malfunctioning in the event of an earthquake that could cause damaging pendulous movement in the absence of firm support means. On the other hand, such apparatus must be periodically checked and maintained which requires its dismounting and removal from the installation. As a result, the support means must be capable of securely holding the apparatus against movement while installed and yet be readily releasible for removal, and easily connectible for reinstallation, particularly when the apparatus is disposed in areas of difficult accessibility.

It is an object of the present invention to provide an improved arrangement for securing pendantly suspended bodies against pendulous movement while facilitating their installation in and removal from comparatively inaccessible areas and particularly to improve upon the supporting means shown in FIG. 1 which is typical of that utilized in the prior art.

The installation and support system of the present invention obviates the need for any accessibility to the lower portion of the apparatus for purposes of installing or removing it in a pool, or sump, or like excavation, and yet provides a secure mounting against any lateral or pendulous movement of the apparatus while suspended in place.

SUMMARY OF THE INVENTION

The present invention involves the mounting of a number of spaced abutment plates about the periphery of the lower portion of a pendantly suspended apparatus, such as a sump pump, by attachment of the plates conveniently to section-connecting flanges thereon and the disposition of cooperating abutment members on appropriate frame structures fastened to the wall of the sump or well in which the pumping apparatus is inserted into the sump it is passed through one or more of the frame structures with the spaced abutment plates on its periphery oriented such that they pass into the interstices between the abutment members which are mounted in a surrounding manner on the frame structures. Then before the upper end of the pumping apparatus is fastened to its suspension mounting at the upper opening of the sump, the apparatus is rotated so that the outer edges of the abutment plates engage the outer edges of respective abutment members with a small clearance fit, thus securing the body against movement in any lateral direction. The ends of the outer edges of the abutment plates are founded to facilitate smooth sliding engagement of the abutting surfaces. For removal of the apparatus, it is merely necessary to rotate it a small amount to againt orient the abutment plates in the interstices between the abutment members and then to lift it from the sump. It is contemplated that the forms of the abutment plates and abutment members may be modified to also provide vertical support for the pumping apparatus. Thus, when the apparatus is inserted into the installation, the only manipulation necessary to secure it against any vertical, lateral or pendulous movement would be a simple rotation to produce engagement between the abutment plates and the abutment members.

BRIEF DESCRIPTION OF THE DRAWINGS

FIG. 3a is a view taken along the lines 3a—3a in FIG. 2a.

DETAILED DESCRIPTION OF THE INVENTION

Figure 1:
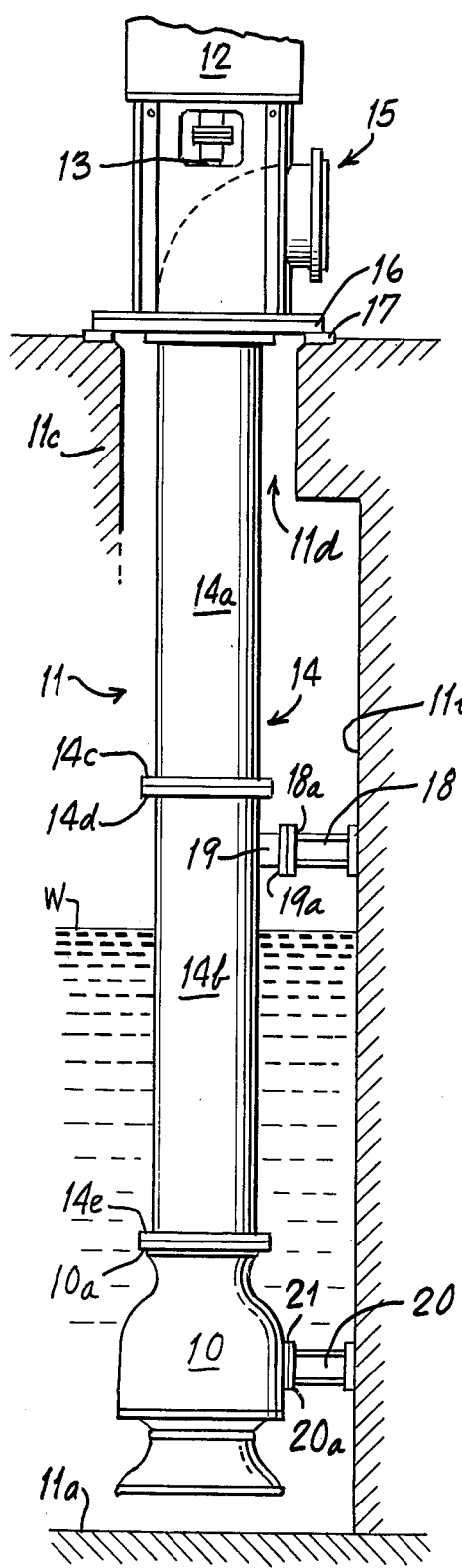
FIG. 1 illustrates a sump pumping apparatus with a support system in accordance with the prior art.

A typical support system for a sump pumping apparatus utilized in the prior art is shown in FIG. 1. The pump unit 10 is shown submerged in water W disposed in a nuclear reactor cooling pool or cooling water intake sump 11 of which a portion of the floor 11a, wall 11b, and cover 11c are indicated. The pump unit 10 is driven by means of a motor 12, mounted above the pool 11, through a shaft 13 which extends down within elongated casing 14 that conducts the pumped water from the pool to the discharge outlet 15 of the pumping apparatus. The elongated casing 14 may comprise two or more sections such as the sections 14a and 14b shown, which sections are connected to each other by means of respective mating flanges 14c and 14d that are bolted together. The lower casing section 14b is similarly connected to the pump unit 10 by means of respective mating flanges 14e and 10a that are bolted together.

The pumping apparatus is pendantly suspended by means of a large flange 16 mounted and bolted on a suitable pad 17 disposed at the opening 11d in the cover 11c of the pool. Seismic supports for securing the casing 15 and pump 10 against lateral or pendulous movement comprise upper and lower columnar members 18 and 20, and other similar intermediate columnar members where appropriate, bolted or otherwise fastened on the lower section 14b and the housing of pump unit 10. The mating means 19 on the lower section 14b of the casing is a columnar member with an end flange 19a that cooperates with a similar flange 18a on the columnar member 18, the flanges being connected by bolting to each other. An end flange 20a on columnar member 20 may be bolted to a suitable fitting 21 on the pump unit housing. Accordingly, when installed, the pumping apparatus is inserted into the pool 11 through the upper opening 11d and suspended from flange 16. It is secured at its lower end by bolting the pump unit housing fitting 21 to columnar member 20 and intermediately secured by bolting the means 19 on casing section 14b to columnar member 18. Conversely, upon removal it is necessary to unbolt the mating means 19 and 21 from columnar members 18 and 20 prior to raising the apparatus out of the pool.

Figure 2:
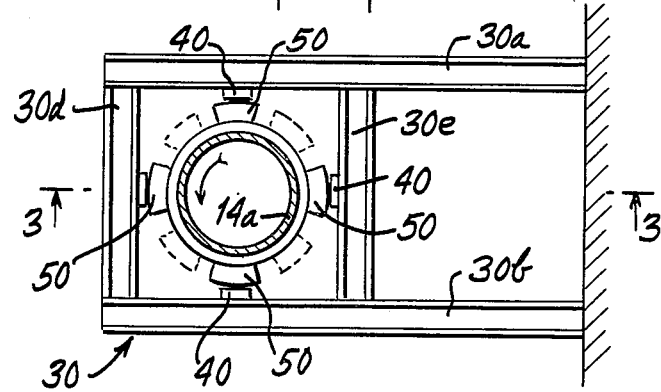
FIG. 2 is a plan view illustrating a support system for the sump pumping apparatus of FIG. 1 in accordance with the present invention.
Figure 3:
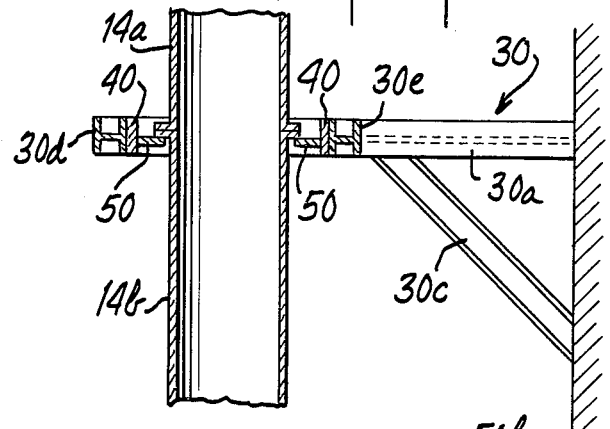
FIG. 3 is a view taken along the lines 3—3 of FIG. 2.
Figure 3A:
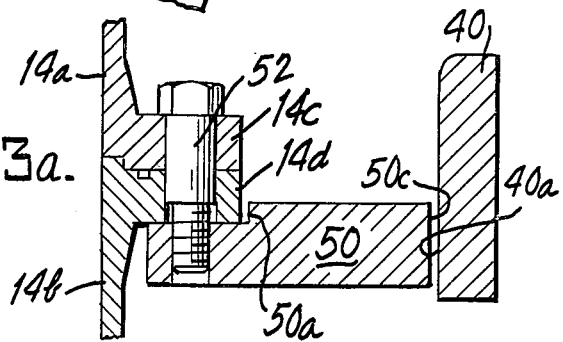

It will be appreciated that in some installations of this type accessibility to the seismic supports may not pose a very great problem, but, more often than not, accessibility to the lower portion of submersible or sump pumping apparatus after insertion in a well or sump, or other narrow excavation, can prove to be extremely difficult, if not impossible. As a result, a problem is presented in registering and securely bolting the columnar members 18 and 20 to the cooperating means 19 and 21 on the apparatus when inserted in position and when it is desired to release and remove the apparatus from the installation. Bolting and access to the lower portion of the pumping appatatus or other pendantly suspended body is obviated by the installation and support system of the present invention, a preferred embodiment of which is shown in detail in FIGS. 2–3a. Instead of the columnar members 18 and 20 of the prior art, in accordance with the present invention a frame structure 30 is provided for mounting on the wall 11b of the sump or pool at approximately the same locations. Frame structure 30 may be composed, for example, of two parallel rigid beams, such as I-beams 30a and 30b, whose inner ends are fastened to the wall 11b and whose outer ends are approximately at the level of the mating flanges 14c, 14d and 14e, 10a on the pumping apparatus when it is installed in the pool or sump. The two beams 30a, 30b may each be supported substantially horizontally by lower inclined I-beams 30c whose upper ends are attached to the parallel beams and whose lower ends are attached to the wall 11b. Two similar cross beams 30d and 30e may be connected to the parallel beams to form a substantially square frame as shown in FIG. 2. Four abutment members 40 in the form, for example, of bronze pads are each mounted intermediately on the square frame structure. The dimensions of the arms of the frame are such as to allow the passage of the pumping apparatus therethrough.

Figure 2A:
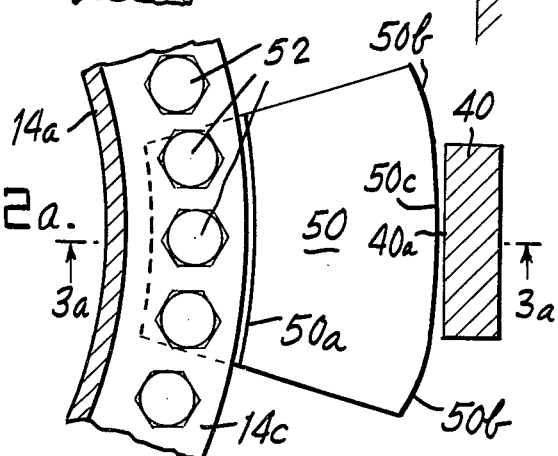
FIG. 2a is an enlarged view of a portion of the system shown in FIG. 2 showing the structural details of the cooperation of the abutment plates and abutment members of the invention.

The body of the apparatus itself is provided with a number of abutment plates 50 which conveniently may be bolted to the mating flanges about the circumference of the apparatus. The plates 50, which like the members 40 may be of bronze or other non-corrosive metal or material, are sector-shaped, as seen in FIG. 2a and may be attached to the underside of the mating flanges (14c, 14d and 14e, 10e) by means of the same bolts 52 which hold the flanges together. A portion 50a of the upper surface of the plates 50 may be cut out to accommodate the lower flange (14d or 10a), and the end portions 50b of their outer edges may be rounded to facilitate smooth sliding engagement with the outer edges of the abutment members 40. Conversely, the rounded outer edge 50b may be provided with a portion 50c for engaging the flat outer edge 40a of member 40. Portion 50c may be flat, as shown, or rounded, but to a radius having its center coincident with the center of the members 10, 14a, 14b, etc.

When the pumping apparatus or body is to be installed or mounted in the sump or pool 11, its lower end is inserted through the opening 11d and down through the frame structures 30 so that the square frame portions surround its periphery. The parts are suitably dimensioned, and the frames 30 are located on the wall 11b of the pool such that when the upper mounting flange 16 engages its mounting pad 17, the mating flanges 14c,, 14d and 14e, 10a will be disposed within the square frame portions. When the apparatus is being lowered through the opening 11d, it is oriented so that the abutment plates 50 will pass into the interstices between the abutment members 50 in the manner shown in dotted lines in FIG. 2, the plates and members being dimensioned and spaced so as to permit such passage. Upon the upper flange 16 engaging its mounting pad 17, but before they are fastened together in place, the apparatus is rotated so that the outer edges 40a of the respective members 40 with a small clearance fit, as shown in solid lines in FIG. 2. The apparatus or body will thus be securely held against any lateral or pendulous movement.

In order to remove the apparatus from this installation, it is merely required after unfastening its upper mounting to rotate it a small amount to again orient the abutment plates 50 in the interstices between the abutment members 40 and to then lift it out of the sump or pool 11. Thus, no separate bolts or tools are needed or access to the lower portion of the apparatus in the sump is required to install and remove the pumping apparatus with this improved installation.

It will be appreciated that the member of frame structures, abutment members and abutment plates as well as their forms and positioning may be varied to suit the requirements of particular installations within the scope of the invention. For example, a triangular surrounding frame with three-point engagement of the abutment elements might be substituted for the square frame, four-point engagement described. Also it is contemplated that the forms of the abutment plates and abutment members may be modified to incorporate an interlocking arrangement which would provide some vertical as well as lateral support for the pumping apparatus. With such an arrangement, when the apparatus was inserted into the installation, the only manipulation necessry to secure it against any vertical, lateral or pendulous movement would be a simple rotation to produce engagement and interlocking between the abutment plates and the abutment members.

What is claimed is:

1. A support apparatus for vertically mounting an elongated body comprising:
   first means attached to the upper portion of the body for pendantly supporting it against gravity; and
   second means for supporting the body against lateral movement comprising:
      fixed frame means for surrounding said body below said first supporting means;
      a plurality of abutment members mounted on said frame means spaced about the periphery of said body; and
      a plurality of means mounted on said body for abutting said abutment members with a small clearance fit, said abutting means being spaced from each other so as to fit within the spaces between said abutment members.

2. A seismic support apparatus for a pendantly suspended body comprising:
   at least one frame means for surrounding said body below its point of suspension;
   at least three abutment members mounted on said frame means; and a plurality of means, mounted on said body about its periphery and lying in a plane normal to the longitudinal axis of said body for respectively abutting said abutment members to secure said body against movement, said abutting means being spaced from each other so as to fit in the interstices between said abutment members.

3. Apparatus as in claim 1 or 2 wherein said abutment members comprise blocks of non-corrosive material having one edge attached to said frame means and the opposite edge engaging said respective abutting means.

4. Apparatus as in claim 3 wherein said abutting means comprise plates of non-corrosive material having an edge with rounded portions on its ends which engages said opposite edge of said respective block.

5. Apparatus for supporting a pendantly mounted sump pumping apparatus, or the like, against lateral or pendulous movement of its lower portion when submerged; in an excavation comprising:
  means fixed on the wall of said excavation for surrounding the lower portion of the pumping apparatus;
  a plurality of spaced abutting members fixed to and disposed about the periphery of said apparatus adjacent said surrounding means; and
  a plurality of spaced abutment means mounted on said surrounding means for respectively abutting said abutting members with a small clearance fit to secure said apparatus against movement, the space between said abutting members and abutment means being such as to permit them to pass through their respective interstices.

6. Apparatus as in claim 5 wherein said surrounding means comprises:
  a first pair of parallel I-beams of equal length each having one end fixed to said wall and both disposed substantially in a horizontal plane; and
  a second pair of parallel I-beams of equal length mounted on and extending between said first pair of I-beams to form a substantially square surrounding portion.

7. Apparatus as in claim 6 wherein said surrounding means further comprises a third pair of parallel I-beams of equal length, each having one end fastened to said wall and the other end attached to one of said first pair of I-beams.

8. Apparatus as in claim 5 wherein said pumping apparatus comprises sections having mating flanges connected to each other by a plurality of bolts and wherein said abutting members comprise plate elements connected to said flanges by said bolts and extending outwardly therefrom.

9. Apparatus as in claim 8 wherein said plate elements are sector-shaped having their larger curved edges extending outwardly with central portions for abutting said abutment means.

10. Apparatus as in claim 9 wherein said plate elements are of non-corrosive material and wherein said abutment means comprise blocks of non-corrosive material.

11. A method of vertically supporting an elongated body against movement comprising the steps of:
  attaching a plurality of abutment plates spaced from each other about the periphery of the body in a plane normal to its longitudinal axis and displaced from its upper end;
  lowering the body through a surrounding frame, having a plurality of abutment pads corresponding in number to said plates and spaced within the frame in a horizontal plane, with the body oriented such that the abutment plates enter the interstices between the abutment pads;
  rotating the body such that the outer edges of the abutment plates engage the outer edges of the abutment pads with a small clearance fit; and
  securing the body to a fixed mounting at its upper end.

* * * * *